United States Patent [19]

Sundberg et al.

[11] Patent Number: 4,526,556
[45] Date of Patent: Jul. 2, 1985

[54] DEVICE FOR CONNECTING TWO SHAFTS

[75] Inventors: Staffan Sundberg, Hofors; Göte Jonsson, Hedemora, both of Sweden

[73] Assignee: SKF Steel Hofors AB, Sweden

[21] Appl. No.: 472,653

[22] Filed: Mar. 7, 1983

[30] Foreign Application Priority Data

Jun. 1, 1982 [SE] Sweden .................................. 8203362

[51] Int. Cl.³ .............................................. F16D 1/06
[52] U.S. Cl. ........................................ 464/182; 403/15
[58] Field of Search .................... 285/381, 382, 417; 403/5, 15, 31, 37, 314; 464/162, 179, 182, 183

[56] References Cited

U.S. PATENT DOCUMENTS

| | | | |
|---|---|---|---|
| 106,755 | 8/1870 | Whitmore | 403/314 |
| 1,458,395 | 6/1923 | Cunningham et al. | 403/314 |
| 3,222,884 | 12/1965 | Lyle | 464/182 X |
| 3,434,303 | 3/1969 | Leyer | 403/314 X |
| 3,531,146 | 9/1970 | Blad et al. | 403/15 |
| 3,673,816 | 7/1972 | Kuszaj | 464/182 X |
| 4,304,424 | 12/1981 | Hansen | 285/382 X |

FOREIGN PATENT DOCUMENTS

| | | | |
|---|---|---|---|
| 2610720 | 9/1977 | Fed. Rep. of Germany | 464/182 |
| 984340 | 2/1965 | United Kingdom | 464/182 |

Primary Examiner—Stuart S. Levy
Assistant Examiner—Daniel P. Stodola
Attorney, Agent, or Firm—Eugene E. Renz, Jr.

[57] ABSTRACT

The invention relates to a device for releasably connecting two shafts (1,2). It comprises two co-operating tapered clamping sleeves (5,6) and means (7,8,9) for relatively displacing the sleeves axially when the sleeves are separated by a pressure medium introduced between the tapered clamping surfaces. In order to make the device suitable for connecting two shafts with a certain distance between the shaft ends, the length of the sleeves is greater than the sum of the lengths of the portions of the respective shafts which are covered by the sleeves, and the bore diameter of the outer sleeve is greater than the outer diameter of the inner sleeve in an area (13) between the ends of the sleeves corresponding to the area between the shaft ends.

4 Claims, 2 Drawing Figures

4,526,556

DEVICE FOR CONNECTING TWO SHAFTS

BACKGROUND AND SUMMARY OF THE INVENTION

The instant invention relates to devices for releasably connecting two shafts, and particularly to shaft connection devices which include inner and outer clamping sleeves having cooperating, tapered, contacting surfaces, means for achieving relative axial displacement of the inner and outer sleeves, and means for supplying a pressure medium between the cooperating, tapered, contacting surfaces.

Such devices are commonly used for connecting two shafts between which great forces and torques are transmitted. The lengths of the sleeves are chosen so that the sleeves enclose sufficiently long portions of the respective shafts in order to establish a desired clamping force between the inner sleeve and the respective shafts when the outer sleeve is mounted on the inner sleeve. The sleeves are made as short as possible for saving space and cost. The connected shafts are therefore usually placed so that the distance between the opposing shaft ends is as short as possible.

Occasionally it is desirable, however, to maintain a certain distance between the shaft ends, for example in order to allow axial displacement of one shaft independent of the other during mounting or dismounting, or in order to give room for handling or indication members for adjusting means running through hollow shafts, e.g. devices for turning the blades of adjustable screw propellers, the connected shafts therewith constituting the propeller shaft. The present invention has an object to provide a device of the kind mentioned above, which device is suitable for connecting shafts with a certain distance between the shaft ends. According to the invention, this is achieved by a device which has the characterizing features recited in the appended claim 1.

Such a device is especialy suitable for releasably connecting two shafts which are arranged at a distance from each other, and it can easily be designed to allow access to members which are attached to devices situated in axial bores in the shafts.

BRIEF DESCRIPTION OF THE DRAWING

The following is a detailed description of the invention with reference to the accompanying drawing, in which.

DESCRIPTION OF THE PREFERRED EMBODIMENT

Figure 1:
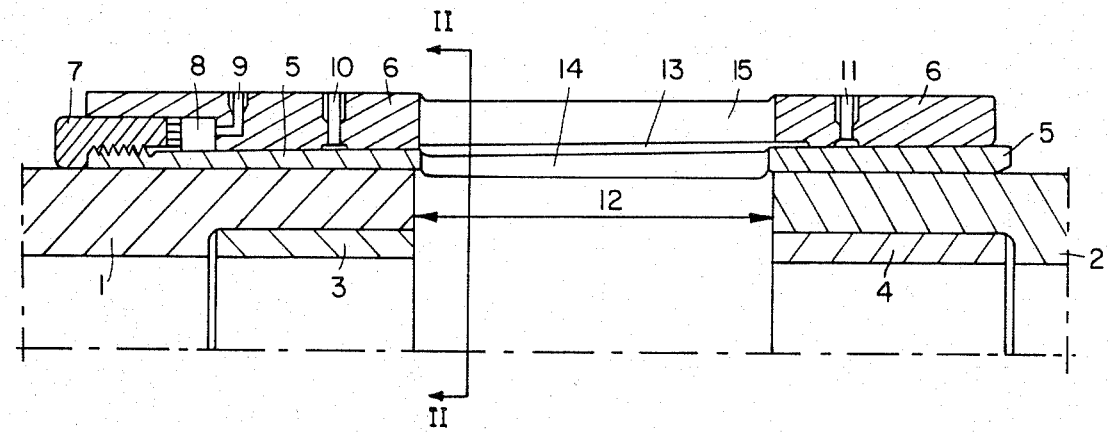
FIG. 1 shows a longitudinal section and FIG. 2 a cross section according to II—II in FIG. 1 of a device according to the invention.
Figure 2:
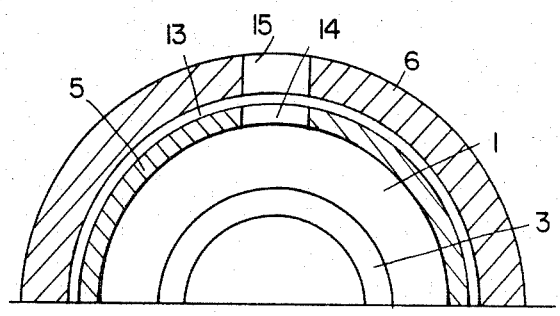

FIG. 1 shows two shafts 1, 2 which are interconnected by a device according to the instant invention.

In order to increase the stiffness of the hollow shafts in the area surrounded by the device, rings 3, 4 of a material with a high strength and modulus of elasticity are arranged in the bores of the shafts. The device comprises an inner clamping sleeve 5 which surrounds the end portion of the shafts and which has a tapered outer surface, and an outer clamping sleeve 6 which surrounds the inner sleeve and which has a bore with a tapered surface corresponding to the tapered outer surface of the inner sleeve. Means for moving one of the sleeves axially in relation to the other are provided in form of an annular piston 7 arranged on threads at the end portion of the inner sleeve and in a recess 8 at the end portion of the outer sleeve, and a channel 9 for supplying a pressure medium to the recess. Channels 10, 11 for supplying a pressure medium between the cooperating tapered surfaces are provided in the outer sleeve. The channels 10, 11 are connected in a known manner to a pressure medium supply source so that when pressure medium is introduced through the channels, it penetrates the confronting contacting tapered surfaces of the sleeve members creating a film between these members which makes it possible to displace the sleeve members axially relative to one another during assembly and disassembly maneuvers. This well-known technique for displacing the sleeve members is similar to that described in the Blad et al U.S. Pat. No. 3,531,146 entitled PRESS OR SHRINK FIT JOINTS, issued Sept. 29, 1970 which patent is completely incorporated herein by reference.

The length of the clamping sleeves is greater than the sum of the lengths of the portion of the respective shafts which are surrounded by the sleeves, the ends of the connected shafts being situated at a distance 12 from each other. Thereby is achieved that one of the shafts can be displaced a distance towards the other shaft when the connection is released, which can be an advantage if e.g. one of the shafts is to be dismounted while displacement of the other is to be avoided, and the first mentioned shaft has to be drawn out from a fixed bearing position or the like during dismounting.

In order to prevent the inner clamping sleeve from being permanently deformed radially inwardly in the area between the shaft ends by the pressure medium which is impressed between the clamping sleeves with a high pressure during the establishing of the connection, the bore diameter of the outer sleeve is greater than the outer diameter of the inner sleeve in an area 13 between the ends of the outer sleeve, which area corresponds to the area between the shaft ends, preferably increased by an area corresponding to the axial displacement of the outer sleeve on the inner sleeve when the connection is established. Therewith an annular space 13 is obtained between the sleeves, surrounding the area of which the inner sleeve is not supported by any shaft. In this space the pressure medium will not be under pressure as long as the space is not completely filled, which normally never occurs.

If, for example, an indication member visible outside the connecting device is desired, such as an indicator for the position of propeller blades adjustable by devices running through the hollow shafts, the sleeves can be provided with recesses 14, 15 through the sleeve walls in the area between the shaft ends, whereby for example an indicator connected to the adjusting device may extend through the recesses and move depending on the movements of the adjusting device.

It is possible to provide two or more recesses around the respective sleeves, e.g. for symmetry reasons, whereby, of course, the pitch angles in the outer and the inner sleeve must be equal.

The embodiment shown in the figure is arranged on hollow shafts and provided with recesses 14, 15 through the sleeves, but the invention is suitable also with massive shafts and with sleeves without recesses through the walls. The space 13 can be established either by an annular recess in the outer sleeve, as shown in the figure, or by an annular recess in the circumference of the inner sleeve. The recesses 14, 15 have an axial extension in order to allow axial movement of a member extending through the sleeves, but it is also possible to make e.g. round recesses through which a rotatable member may extend.

We claim:

1. A device for releasably connecting two shafts, the ends of which are spaced at a predetermined axial distance from one another, comprising an elongated inner clamping sleeve circumscribing and overlying an end portion of each of said shafts and having a tapered outer peripheral surface, an elongated outer clamping sleeve circumscribing said inner sleeve and having a bore with a tapered surface complementing and cooperating with the tapered outer peripheral surface of said inner sleeve, means for effecting axial displacement of said inner and outer clamping sleeves relative to one another, means for supplying a pressure medium between the confronting complementary engaging tapered surfaces of said sleeves, and means defining a circumferentially extending annular recess in at least one of the confronting surfaces of one of said sleeves having an axial dimension at least equal to and surrounding the axial distance between the axial end faces of the shaft members.

2. A device as claimed in claim 1, wherein said recess is formed in said inner sleeve.

3. A device as claimed in claim 1, wherein said recess is formed in said outer sleeve.

4. A device as claimed in claim 1, including means defining slotted openings through said sleeves in the region between the axial end faces of the shaft members.

* * * * *